United States Patent [19]

Reisman et al.

[11] 4,304,294

[45] Dec. 8, 1981

[54] THERMAL ENERGY SWITCH

[75] Inventors: Elias Reisman, Orange; David S. Goodsell, Costa Mesa, both of Calif.

[73] Assignee: Ford Aerospace & Communications Corp., Detroit, Mich.

[21] Appl. No.: 934,439

[22] Filed: Aug. 17, 1978

[51] Int. Cl.$^3$ ............................................. F28F 13/00
[52] U.S. Cl. ...................................... 165/32; 165/41; 165/104.17
[58] Field of Search ................. 165/32, 104 S, 41, 96, 165/185; 62/383

[56] References Cited

U.S. PATENT DOCUMENTS

| | | | |
|---|---|---|---|
| 2,499,736 | 3/1950 | Kleen | 165/104 S X |
| 3,177,933 | 4/1965 | Webb | 165/32 X |
| 3,220,647 | 11/1965 | Riordan et al. | 236/1 |
| 3,225,820 | 12/1965 | Riordan | 165/32 X |
| 3,264,448 | 8/1966 | Lehmer | 165/32 X |
| 3,390,717 | 7/1968 | Townsend | 165/1 |
| 3,463,224 | 8/1969 | Myers | 165/32 |
| 3,478,819 | 11/1969 | Reinke | 165/32 |
| 3,489,203 | 1/1970 | Fischell | 165/32 |
| 3,529,194 | 3/1970 | Kroebig | 165/32 |
| 3,578,068 | 5/1971 | Elliott et al. | 165/39 |
| 3,977,206 | 8/1976 | Simmons | 62/170 |

Primary Examiner—Albert W. Davis
Attorney, Agent, or Firm—Paul K. Godwin, Jr.; Clifford L. Sadler

[57] ABSTRACT

A solid state temperature gradient cooling system in which thermal energy is, under a first condition, carried from a heat source to a heat storage device and under a second condition is carried from the heat source and storage device to a heat dissipator. The change in conditions is responsive to changes in the temperature of the heat dissipator above and below a predetermined value. Bimetallic disc elements are employed, which respond to temperature changes about the predetermined temperature, and snap from a first condition concave/convex surface configuration to a second condition convex/concave configuration. The disc elements are supported about their outer peripheries so that the change in configuration will cause the center of the disc to move along an axis normal to the disc. This movement is used to respectively open and close a low resistance thermal path between the heat dissipator and a first thermal conducting path defined to transmit thermal energy between the heat source and the heat sink.

12 Claims, 2 Drawing Figures

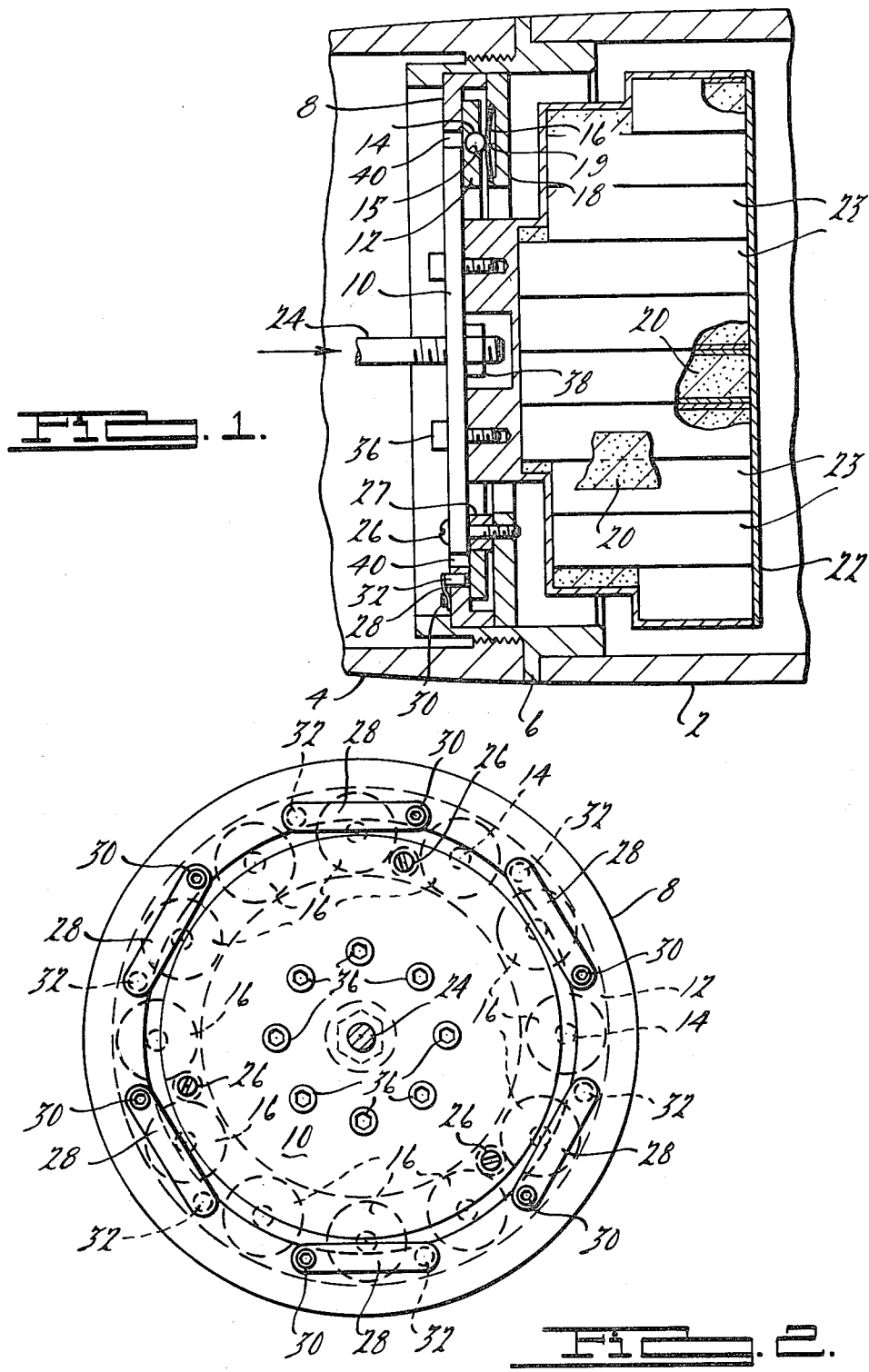

THERMAL ENERGY SWITCH

LICENSE RIGHTS

The U.S. Government has a paid-up license on this invention and the right, in limited circumstances, to require the patent owner to license others on reasonable terms as provided for by the terms of Contract No. F08635-76-C-0002 awarded by the U.S. Air Force.

BACKGROUND OF THE INVENTION

1. Field of the Invention

The present invention is directed to efficient thermal-mechanical control of thermal energy flow paths in systems which require thermal energy transfer.

2. Description of the Prior Art

Thermoelectric coolers are known for providing efficient, light weight mechanisms to maintain detectors, such as those used for sensing infrared radiation energy in air-to-air missiles, at proper operating temperatures. However, a thermoelectric cooler must be able to dissipate the heat removed from its associated detector in order to maintain its efficiency. It has been proposed that a low resistance thermal path be provided between the hot electrode of the thermoelectric cooler and the skin of the missile. This provides a sufficient temperature gradient when the aircraft carrying the missile is flying at subsonic speeds, since the air flow over the skin of the missile cools the skin. However, when the aircraft travels at supersonic speeds, the skin temperature of the missile may become hotter than the hot electrode of the thermoelectric cooler and cause a reverse temperature gradient that will adversely effect the operation of the thermoelectric cooler and, consequently, the operations of the detector.

An alternative approach is to thermally isolate the interior of the missile from the skin and store the heat, removed by the thermoelectric cooler, in a heat sink within the interior of the missile. Unfortunately, when the aircraft returns to base without firing the missile, the heat stored within the heat sink must be removed before the missile may be flown again. A further disadvantage to an isolated heat sink system is that when the missile is stored in hot climates, it may be necessary to use an auxiliary refrigeration system to cool down the heat sink before each flight.

SUMMARY OF THE INVENTION

The present invention is intended to overcome the disadvantages recited above by providing a self-sensing thermal switch which allows heat generated by a source within a missile to be dissipated to the outer skin of the missile, when the outer skin is below a predetermined temperature, and which thermally isolates the interior of the missile from the skin, when the temperature of the skin is above a predetermined value.

On a typical flight profile of an aircraft carrying a missile contaning the present invention, it leaves the ground and travels at subsonic speeds. At subsonic speeds the outer skin of the missile is cooled by the airflow over the skin. During that time, the thermal switching system is in a first condition wherein the thermal energy from the thermoelectric cooler is allowed to flow through a low resistance thermal path provided to the outer skin of the missile. At the same time, thermal energy stored in a heat sink is also allowed to flow through the low resistance thermal path provided to the outer skin of the missile. Such flow of stored thermal energy will continue as long as a gradient is present between the outer skin of the missile and the heat sink. When the aircraft reaches a speed where the air friction on the outer skin of the missile causes that skin to heat up above a predetermined temperature value, the thermal switching system of the present invention will automatically switch to a second condition and cause the low resistance thermal path provided to the outer skin to be opened. In this second condition the thermoelectric cooler and associated heat sink are thermally isolated from the outer skin of the missile. Subsequently, when the aircraft returns to subsonic speeds and the skin of the missile is cooled below the predetermined temperature value, the thermal switching system switches back to the first condition and thereby closes the low resistance thermal path provided to the outer skin. This return to the first condition allows the skin of the missile to dump the thermal energy that was stored in the heat sink and to provide a type of resetting mechanism therefor.

Opening and closing the low resistance thermal path to the outer skin of the missile is achieved by employing a plurality of bimetallic discs selected to change their respective physical configurations at a predetermined temperature. The predetermined temperature is generally selected to be a value which is less than the hot electrode of the thermoelectric cooler and also less than the phase change temperature of a phase changing heat sink material, when such a heat sink material is employed as a means for storing thermal energy. The bimetallic discs have two surfaces which are respectively concave/convex at temperatures below their rated critical temperature values and respectively convex/concave at temperatures above their rated critical temperature values. The change in surface configurations at the rated critical temperature is a snap action which is instantaneous and causes the center of each disc to change its position along the central axis of the disc with respect to the relatively fixed location of the disc periphery. The relative movement of the disc center with respect to the periphery is employed herein to cause corresponding movement of a thermal conducting member between first and second positions to effect closing and opening of the thermal path to the outer skin of the missile.

A phase changing material is used as a heat sink in the disclosed embodiment of the present invention, since such materials are readily available over a range of critical temperatures. Several materials with heats of fusion above 3.1 W-min/gm can be found for temperatures between 35° C. and 65° C. Paraffins have been found to be particularly desirable.

In those instances where the ambient temperature for a missile on an aircraft sitting on the ground is 120° F. (48.9° C.) and it is desirable to begin the flight with the heat sink material solidified, the heat sink material is selected to have a melting point above the ambient temperature. Therefore, a wax such as tetracosane could be selected, as the heat sink material, since its melting point is 124° F. (51.1° C.). Other paraffins, such as eicosane having a melting point of 100° F. (37.8° C.) and hexacosane having a melting point of 133° F. (56.1° C.) may also be used as heat sink material when appropriate for the known climate in which flights will originate.

The container used for storing the phase changing heat sink material is of a unique configuration which allows for a highly efficient transfer of thermal energy from the thermal conducting path to the heat sink material. Primarily because the paraffin is a poor thermal conductor when it changes to its liquid phase and flows to insulate the solid wax from the thermal path, the container has been designed to have a large amount of thermal energy transfer surface in contact with the heat sink material. The disclosed embodiment shows the container as comprising several tubes of thermally conducting material arranged so that the heat sink material is in intimate contact with both the internal and external surfaces of the tubes.

Therefore, it is an object of the present invention to provide a thermo-mechanical switch which closes and opens a thermal energy conducting path between two points in response to the temperature at one of those points being respectively below or above a predetermined value.

It is a further object of the present invention to provide a thermo-mechanical system for controlling the dumping of accumulated thermal energy, independent of any electrical energy.

It is still a further object of the present invention to provide a phase changing heat sink material in a unique storage configuration to achieve a high efficiency transfer and storage of thermal energy within said heat sink.

BRIEF DESCRIPTION OF THE DRAWINGS

FIG. 1 illustrates a partial cross-section of the subject invention as it is embodied in a missile.

FIG. 2 illustrates a plan view of the invention removed from the environment shown in FIG. 1.

DESCRIPTION OF THE PREFERRED EMBODIMENT

The present invention is described below with concurrent reference to FIGS. 1 and 2. In FIG. 1, the invention is shown mounted in a partial cross-section of a missile body having a nose cone 4 and a main outer skin 2. In FIG. 2 the present invention is shown in plan view, removed from the missile body, so that its description can be more easily understood. It should be noted that identical reference numerals in FIGS. 1 and 2 refer to the same element in each figure. In those cases where a plurality of identical elements are included, which perform identical functions, those elements are shown with the same reference numeral.

The thermal switch is structured in a circular configuration so as to dissipate heat from a central source (not shown) such as a thermoelectric cooler, towards the cylindrical outer skin 2 of the missile. In this configuration, thermal energy from the source conducts in the direction of the arrow along a low thermal resistance threaded shaft 24. The shaft 24 is connected to a low thermal resistance inner plate 10 with a nut 38.

A heat sink 20 comprising a phase changing material, such as paraffin, is confined within a container 22. The container 22 is constructed of a low thermal resistance material and attached to the inner plate 10 by bolts 36. Therefore, a first thermal energy conducting path is defined by the shaft 24, inner plate 10, and container 22 between the heat source (not shown) and the heat sink 20. Copper is used as the low thermal resistance material to form the shaft 24, inner plate 10, and container 22, in the preferred embodiment.

A thermal conducting outer support ring 8 is formed to have a portion which is coplanar with the plate 10 and so as to have an inner diameter larger than the diameter of the plate 10. An air gap 40 is defined, by the difference in diameters between the support ring 8 and the inner plate 10, sufficiently large enough to provide thermal insulation therebetween.

An actuator support ring 18 abuts, for thermal conduction, against an outer portion of the support ring 8 and is held in a fixed spaced relationship with respect to the inner plate 10 by a plurality of thermal insulating screws 26 and thermal insulating spacers 27. The above described construction provides thermal insulation of the inner plate 10 from both the support ring 8 and the actuator support ring 18.

The actuator support ring 18 provides nesting sockets 19 for a plurality of bimetallic disc shaped actuators 16. Each of the bimetallic actuators 16 are identical in that each one has complimentary concave and convex surfaces which reverse their surface configurations at the same predetermined temperature. The bimetallic discs 16 are commercially available and are selected by size and rated switching temperature. The bimetallic discs employed in the prototype of the invention were found to provide the desired switching action at $\pm \frac{1}{2}°$ F. of the specified rating.

A thermal switching ring 12 having a mean diameter which corresponds to the diameter of the air gap 40 is float mounted adjacent the coplanar portions of the inner plate 10 and the support ring 8 so as to be movable to make and break a thermal conductive path between the inner plate 10 and the support ring 8.

An adapter ring 6, as shown for the missile installation of the thermal switch unit, is connected to provide a low resistance thermal energy conducting path via the support ring 8 to the outer skin 2 of the missile. The actuator support ring 18 is mounted in the adapter ring 6 and is connected thereto to provide low resistance to thermal energy passing therebetween. In this embodiment the outer support ring 8 and the actuator support ring 18 are constructed of copper, while the adapter ring 6 is constructed of aluminum.

As shown in FIG. 1, the switching ring 12 is shown forced to bridge the gap 40 between the inner plate 10 and the outer support ring 8 to provide a low resistance thermal conducting path therebetween. The switching ring 12 is held in this position via the bimetallic discs 16 in mechanical contact with insulating balls 14 mounted in ball sockets 15 in the ring 12 and biased so as to contact the center of the discs 16. FIG. 1, of course, illustrates that the temperature on the outer skin 2 of the missile is below the rated critical temperature of the bimetallic disc 16 so that the switching ring 12 is forced to effect closing of the thermal switch. The temperature of the skin 2 is communicated, to the adapter ring 6 and the actuator support ring 18, and is detected by the bimetallic disc 16. When the bimetallic disc 16 senses that the temperature is above its rated critical value, it will reverse its curvature orientation so that the concave surface becomes convex and the convex surface becomes concave. The switching ring 12 is spring biased by several thermally insulating pins 32 and associated leaf springs 28. Therefore, when the bimetallic discs 16 snap to their above critical temperature configurations, the spring biased switching ring 12 follows the central surface movement of the discs and opens the thermal path, between the inner disc 10 and the support ring 8, to thereby establish an insulating air gap therebetween.

While the thermal switching system is open, the thermal energy is conducted from the source through the first path defined by shaft 24, inner plate 10 and container 22 to the heat sink 20. The heat sink material 20 is preferably a phase changing material having a phase change temperature characteristic which is less than the ambient temperature expected for the missile prior to flight. Paraffin materials have been found to be particularly useful as heat sink materials due to their phase change temperature characteristics and their heat absorbing vs. mass characteristics. Such materials serve to provide thermal energy storage when that energy is conducted along the first path from the heat source, by absorbing heat from the conducting container 22 and changing from a solid to a liquid phase. However, as the material changes to its liquid phase the liquid tends to insulate the remaining solid material from the conducting surfaces of the container 22. Therefore, the heat sink container 22 is designed with increased heat distribution area so as to provide increased surface contact between the container 22 and the heat sink material 20. The novel design calls for a plurality of thermal energy conducting tubes 23 integral with and distributed throughout the container. In addition, each tube 23 is in intimate contact with each adjacent tube to provide a continuous thermal energy conducting path within the container 22. The heat sink material is located within and without the tubes 23 within the container 22.

The advantages of the present invention are described above as they relate to a missile. However, it is clear that many modifications, adaptations and variations of the invention may be made which employ the concepts described herein. Therefore, it is intended by the appended claims to cover all such modifications and variations which fall within the true spirit and scope of the invention.

What is claimed is:

1. A thermal switch system for controlling the path of thermal energy flow due to a temperature gradient, comprising:
    means for providing a source of thermal energy;
    means for providing a first low resistance path for the flow of said thermal energy from said source means;
    heat sink means for receiving and storing said thermal energy flowing in said path means when a temperature gradient is established between said source means and said heat sink means;
    means defining a heat dump for dissipating thermal energy flowing thereto from said system;
    switching means disposed between said first path means and said heat dump means for providing a second low resistance thermal energy path therebetween when the temperature of said heat dump means is below a predetermined value and for providing a non-conducting path therebetween when said temperature of said heat dump means is above said predetermined value;
    said switching means includes a bimetallic disc in contact with said heat dump means, having a first concave surface and a second convex surface when the temperature of said heat dump means is below said predetermined temperature value and having said first and second surfaces of reverse configurations when the temperature of said heat dump means is above said predetermined temperature value;
    an insulating element oriented to contact and move with one of said surfaces; and
    a thermal conducting element biased against said insulating element to move into thermal contact with said heat dump means and said first conducting path means when said temperature of said heat dump means is below said predetermined value and move with said insulating element and break said thermal contact when said temperature of said heat dump means increases above said predetermined value.

2. The thermal switch system as in claim 1, wherein said first surface of said bimetallic disc is in thermal contact with said heat dump means and said second surface of said bimetallic disc is in contact with said insulating element.

3. A thermal switching system as in claim 2, wherein said heat sink means includes a material that changes from a solid to a liquid phase at a selected temperature below said predetermined temperature value.

4. A thermal switching system as in claim 3, wherein said material is a paraffin wax.

5. A thermal switching system as in claim 1, wherein said system is employed in a missile having an internally mounted radiation detector which serves as said heat source and an outer skin which serves as said heat dumping means.

6. A thermal switching system for controlling thermal energy flow paths comprising:
    a source of thermal energy;
    a thermal energy heat sink;
    a low resistance path connection between said source and said heat sink to define a first thermal energy conduction path therebetween;
    a thermal conducting member movable between a first position in thermal conducting contact with said low resistance connection and a second position thermally insulated from said connection;
    a thermal energy dissipator in thermal conducting contact with said movable member when said member is in said first position;
    at least one bimetallic actuator in thermal conducting contact with said dissipator and mounted adjacent said movable member for forcing said a member to its first position when the temperature of said dissipator is below a predetermined value and;
    at least one biasing spring mounted for forcing said movable member to its second position when the temperature of said dissipator goes above said predetermined value.

7. A thermal switching system as in claim 6, wherein said bimetallic actuator is disc shaped having a first surface which is convex when said actuator disc is below said predetermined temperature value and concave when said actuator disc is above said predetermined temperature value; and said actuator disc is mounted on its periphery to obtain relative movement of its central portion of said first surface when said temperature changes about said predetermined value.

8. A temperature switching system as in claim 7, including means for mounting said movable member for relative movement with a central portion of said first surface and said at least one bimetallic actuator.

9. A thermal switching system as in claim 8, wherein said system includes a plurality of bimetallic actuators mounted in an actuator support ring about a central axis; and said movable member is a planar ring having a mean diameter about said central axis equal to that of a circle defined by said central portions of said bimetallic actuators mounted about said central axis.

10. In a missile containing a radiant energy detector and a cooling system for said detector, a thermal switch system comprising:

means for storing thermal energy;

means providing a first thermal energy conduction path between said cooling system and said storing means;

means in thermal conducting contact with the skin of said missile for responding to changes in the temperature of said skin about a predetermined temperature value by predictably changing its physical geometry; and means mounted to follow the physical change of said responding means, to provide a thermal energy conducting path between said first path means and said skin when said skin temperature is below said predetermined value and to provide a non-conducting path therebetween when said skin temperature is above said predetermined value.

11. A thermal switch system as in claim 10, wherein said responding means includes a bi-metallic disc having a first concave surface and a second convex surface when the temperature of said skin is below said predetermined temperature and having said first and second surfaces of reverse configurations when the temperature value of said skin is above said predetermined temperature value.

12. A thermal switch system as in claim 11, wherein said following means includes an insulating element oriented to contact and move with one of said surfaces and a thermal conducting element biased against said insulating element to move into thermal contact with said skin and said first thermal energy conduction path means when said temperature of said skin is below said predetermined value and to move with said insulating element and break said thermal contact when said temperature of said skin increases above said predetermined value.

* * * * *